(12) United States Patent
Bisgrove et al.

(10) Patent No.: US 6,685,886 B2
(45) Date of Patent: *Feb. 3, 2004

(54) AGITATION SYSTEM FOR A FLUID BED PROCESSING SYSTEM AND A METHOD THEREOF

(75) Inventors: Bruce A. Bisgrove, Ontario, NY (US);
Ryszard Braun, Rochester, NY (US);
Robert C. Fewkes, Webster, NY (US)

(73) Assignee: Genencor International, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,801

(22) Filed: Dec. 17, 1998

(65) Prior Publication Data

US 2001/0002987 A1 Jun. 7, 2001

(51) Int. Cl.[7] ................. B01J 8/18; B01J 8/38; B01F 13/02; B01F 15/02
(52) U.S. Cl. ............ 422/143; 422/139; 422/140; 422/224; 422/225; 366/101; 366/107; 366/194; 366/243; 366/244
(58) Field of Search ............ 422/139, 140, 422/143, 144, 224, 225, 229, 171, 172; 366/101–104, 107, 194, 243, 244, 249, 252, 279, 282, 283, 296, 328.2, 342, 344

(56) References Cited

U.S. PATENT DOCUMENTS

| | | | |
|---|---|---|---|
| 3,514,510 A | 5/1970 | Hoffman, Jr. | 264/117 |
| 3,632,257 A | 1/1972 | Ashizawa et al. | 425/222 |
| 3,768,365 A * | 10/1973 | Howe | 90/15.1 R |
| 3,807,961 A * | 4/1974 | Markel | 23/277 R |
| 3,907,956 A | 9/1975 | Meunier | 264/117 |
| 4,222,727 A | 9/1980 | Adachi et al. | 425/222 |
| 4,237,814 A | 12/1980 | Ormós et al. | 118/24 |
| 4,306,815 A * | 12/1981 | Majer et al. | 366/147 |
| 4,366,123 A * | 12/1982 | Kato et al. | 422/135 |
| 4,427,417 A | 1/1984 | Porasik | 23/313 R |
| 4,588,366 A | 5/1986 | Glatt | 425/222 |
| 4,789,321 A | 12/1988 | Dingus | 425/222 |
| 5,085,170 A | 2/1992 | Hüttlin | 118/303 |
| 5,152,942 A | 10/1992 | Nakamara et al. | 264/409 |
| 5,429,808 A * | 7/1995 | Kuroda et al. | 422/176 |
| 5,480,617 A | 1/1996 | Uhlemann et al. | 422/140 |
| 5,695,701 A | 12/1997 | Funder et al. | 264/117 |
| 5,700,497 A | 12/1997 | Stone et al. | 425/222 |
| 5,762,883 A * | 6/1998 | Okazoe et al. | 422/168 |
| 5,887,973 A * | 3/1999 | Ahman et al. | 366/103 |
| 6,030,357 A * | 2/2000 | Daoud et al. | 604/26 |

FOREIGN PATENT DOCUMENTS

| | | | |
|---|---|---|---|
| DE | 27 00 817 | 7/1978 | B01J/8/24 |
| DE | 28 20 077 | 11/1978 | B01J/8/28 |
| JP | 60216836 | 10/1985 | B01J/8/40 |

OTHER PUBLICATIONS

*Fluid Bed Systems* 4–page brochure with 1–page attachment entitled "Agitator" from Fluid Air Inc., Naperville, Illinois (1991).

(List continued on next page.)

*Primary Examiner*—Jerry D. Johnson
*Assistant Examiner*—Alexa A. Doroshenk
(74) *Attorney, Agent, or Firm*—Kilyk & Bowersox, P.L.L.C.

(57) ABSTRACT

A fluid bed processing system for particles with an agitation system includes a product chamber with an interior and a plurality of elongated structures. The elongated structures extend at least partially across the interior of the product chamber and are positioned in the product chamber where the particles are located. The fluid bed processing system also includes a system for engaging the elongated structures to agitate the particles in the product chamber.

14 Claims, 6 Drawing Sheets

OTHER PUBLICATIONS

Watano et al., "Scale–Up of Agitation Fluidized Bed Granulation. I. Preliminary Experimental Approach for Optimization of Process Variables," *Chemical & Pharmaceutical Bulletin*, 43(7):1212–1216 (1995).

Watano et al., "Scale–Up of Agitation Fluidized Bed Granulation. II. Effects of Scale, Air Flow Velocity and Agitator Rotational Speed on Granule Size, Size Distribution, Density and Shape," *Chemical & Pharmaceutical Bulletin*, 43(7);1217–1220 (1995).

Watano et al., "Scale–Up of Agitation Fluidization Bed Granulation. III. Effects of Power Feed Weight and Blade Angle on Granule Size, Density and Shape," *Chemical & Pharmaceutical Bulletin*, 43(7):1224–1226 (1995).

Watano et al., "Scale–Up of Agitation Fluidized Bed Granulation. IV. Scale–Up Therory Based on Kinetic Energy Similarity," *Chemical & Pharmaceutical Bulletin*, 43(7):1227–1230 (1995).

Watano et al., "Scale–Up of Agitation Fluidized Bed Granulation. V. Effect of Moisture Content on Scale–Up Characteristics," *Chemical & Pharmaceutical Bulletin*, 45(4):710–714 (1997).

* cited by examiner

AGITATION SYSTEM FOR A FLUID BED PROCESSING SYSTEM AND A METHOD THEREOF

FIELD OF THE INVENTION

This invention relates generally to a fluid bed processing, and, more particularly, to an agitation system for a fluid bed processing system.

BACKGROUND OF THE INVENTION

Fluid bed processing systems and methods can be used in a variety of different applications. For example, fluid bed processing systems and methods can be used to dry wet particles for further processing or discharge. Fluid bed processing systems and methods can also be used to coat particles by building identifiable layers evenly over an identified core. Further, fluid bed processing systems and methods can be used to granulate particles into larger aggregates in which the original particles can still be identified in the aggregates.

In fluid bed processing systems and methods, particles to be processed are loaded into a container and are then fluidized into an expansion chamber. If the particles are going to be coated or granulated, a solution is sprayed onto the particles. With the solution, either layers are coated on the particles or the particles begin to aggregate together to form larger particles. Regardless of whether or not a solution is sprayed on to the particles, the particles dry as they descend down in the expansion chamber and then are blown back up. This up and down process continues until either the particles are dry and/or the desired coating or agglomeration has occurred. The particles are then discharged from the container.

One problematic area with prior systems is in the bed or bottom of the container where the particles to be fluidized are located. As air is blown into the bed of the product chamber to fluidize and mix these particles, large bubbles or pockets of air are often formed in the bed of particles. These bubbles or pockets disrupt the fluidization process so that particles in the bed of the container are not uniformly fluidized into the expansion chamber across the container. This non-uniformity in fluidization also disrupts heat transfer in the bed of the container so that heat is not be uniformly distributed throughout the bed of particles. This non-uniformity in fluidization may also cause temporary undesired agglomeration of the particles in the bed of the container. When these undesired agglomerations are eventually broken apart during processing an aesthetically displeasing condition know as "brown eye" results. To minimize these problems, the batch size of particles which can be loaded into the container and the spray rate are often reduced, however this reduces the production capacity of the fluid bed processing system.

Effective systems and methods for overcoming these problems have not yet been developed. For example, simply installing a blade or propeller to rotate around the circumference of the bottom of the container to correct these fluidization problems will not work effectively. The weight of the particles on the propeller in the bed of the container would make it difficult to rotate the propeller around the container. As a result, the motor necessary to drive the propeller would be prohibitively large and expensive. Additionally, the ends of the propeller would be prone to jamming from the weight of the particles. The batch size of particles loaded into the container could be reduced, but this would reduce the production capacity of the fluid bed processing system.

SUMMARY OF THE INVENTION

A fluid bed processing system with an agitation system in accordance with one embodiment of the present invention includes a product chamber with an interior and a plurality of elongated structures. The elongated structures extend at least partially across the interior of the product chamber and are positioned in the product chamber where the particles are located. The apparatus also includes a system for engaging the elongated structures to agitate the particles in the product chamber.

A fluid bed processing system with an agitation system in accordance with another embodiment of the present invention includes a product chamber with an interior and a plurality of pipes. The pipes extend at least partially across the interior of the product chamber and are positioned in the product chamber where the particles are located. Each of the pipes has at least one outlet jet located in the product chamber. A first source of fluid is connected to each of the pipes to supply a first fluid to the pipes and out through the outlet jets to agitate the particles.

A fluid bed processing system with an agitation system in accordance with another embodiment of the present invention includes a product chamber with an interior and a plurality of interconnected shafts. The interconnected shafts extend at least partially across the interior of the product chamber and are positioned in the product chamber where the particles are located. A drive system is connected to oscillate the interconnected shafts in at least one direction.

A fluid bed processing system with an agitation system in accordance with another embodiment of the present invention includes a product chamber with an interior and at least one shaft. The shaft extends at least partially across the interior of the product chamber along a first axis, rotates about the first axis, and is positioned in the product chamber where the particles are located. A plurality of agitating bars extend out from the shaft. A drive system is connected to rotate the shaft about the first axis. The system may include a plurality of shafts which extend across the product chamber, each along its own axis and each rotating about its own axis.

A method of fluid bed processing of particles with an agitation system in accordance with another embodiment of the present invention includes a number of steps. First, the particles are loaded into a product chamber with a plurality of elongated structures extending across a bed of the product chamber. Once the particles are loaded in the product chamber, the particles are agitated with the elongated structures. At least a portion of the particles are also fluidized into an expansion chamber above the product chamber with a first fluid from a first fluid source. The fluidized particles may be sprayed with a second fluid from a second fluid source.

The present invention provides a number of advantages including the ability to minimize or prevent the formation of transient agglomerates in the product chamber before the particles are dried or formed into enlarged particles. As a result, the condition known as "brown eye" can be minimized or eliminated.

Another advantage of the present invention is that the particles are continuously agitated across substantially the entire bed of the product chamber, instead of having no agitation or only periodic agitation of portions of the particles across the bed of the product chamber. As a result, the present invention provides more uniform fluidization across and heat transfer characteristics in the particles in the product chamber. With more uniform fluidization and better heat transfer, larger batch sizes of particles can be loaded into the product chamber and higher spray rates can be used which increases the production capacity for the fluid bed processing system.

Yet another advantage of the present invention is that the embodiment with an agitation system with pipes with outlet jets provides better control over the agitation because a separate source of fluid from the one used to fluidize the particles is used to supply fluid to the pipes to agitate the particles. As a result, characteristics, such as the rate of flow for the fluids and the temperature of the fluids, can be optimized for agitating the particles and also for fluidization of the particles.

Yet another advantage of the present invention is that the embodiment with an agitation system with at least one shaft which extends across at least a portion of a product chamber along a first axis and rotates about the first axis can be rotated much more easily and with less jams than, for example, a propeller located in the bottom of the product chamber whose rotational movement is restricted by the weight of the particles in the product chamber.

DETAILED DESCRIPTION

Figure 1:
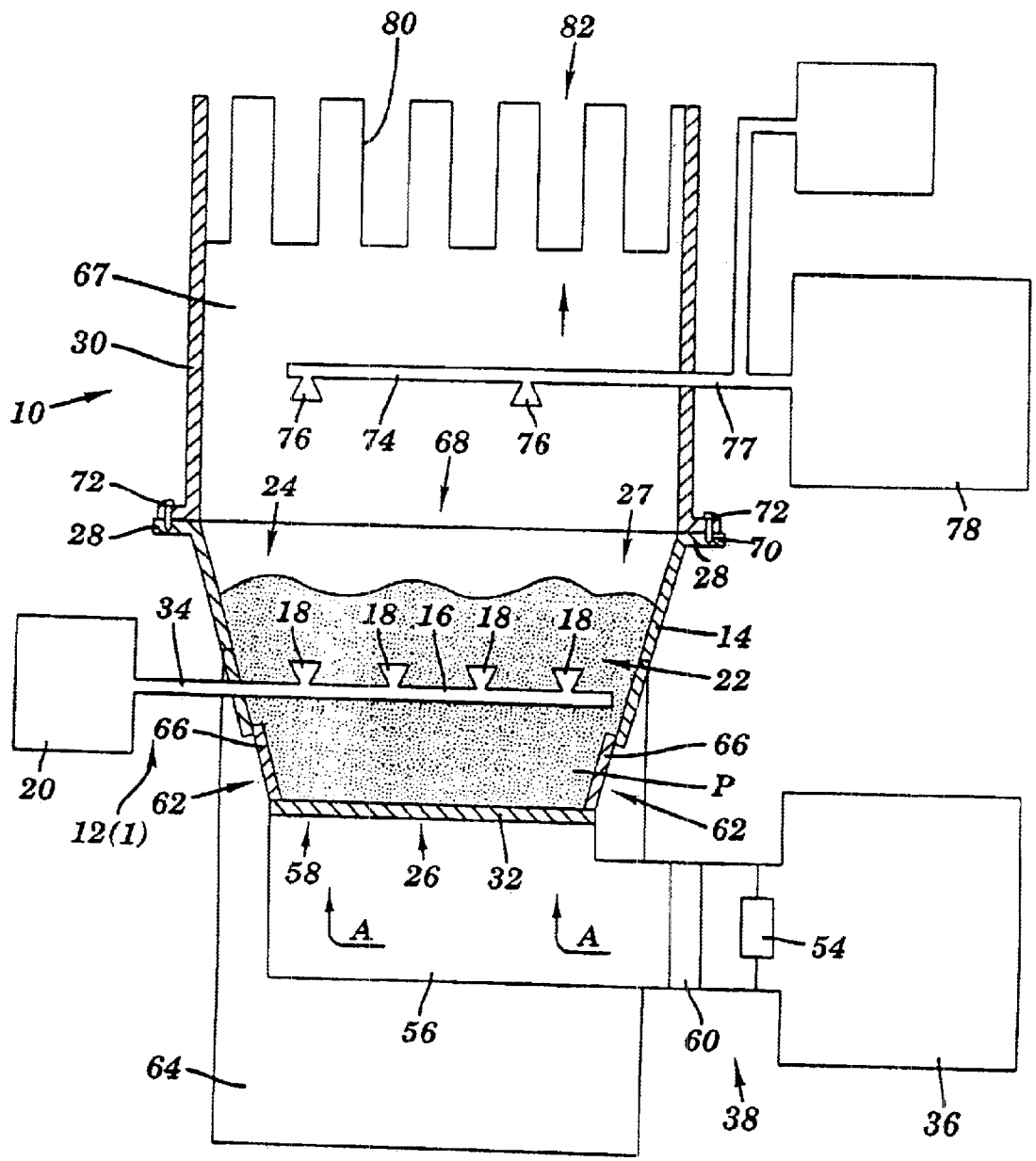
FIG. 1 is a cross-sectional view of a fluid bed processing system with an agitation system in accordance with one embodiment of the present invention.
Figure 2:
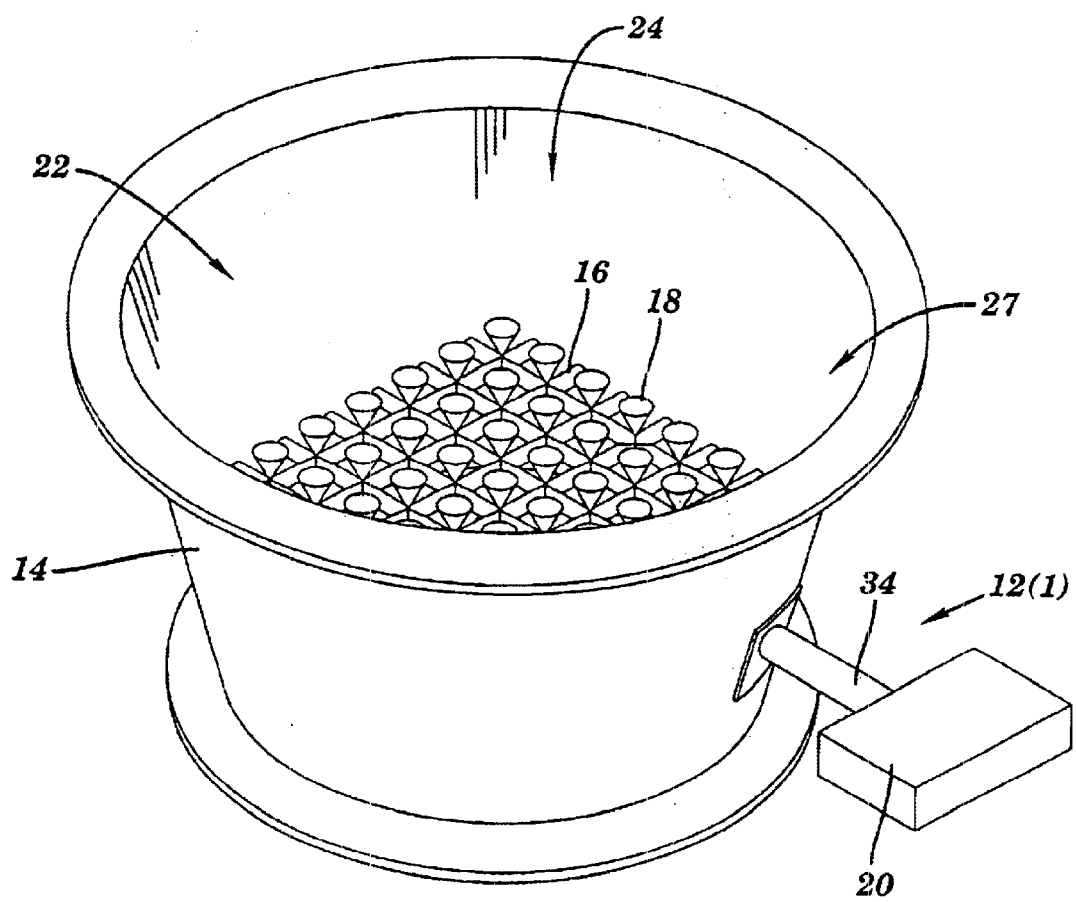
FIG. 2 is a perspective view of the agitation system shown in FIG. 1.

A fluid bed processing system 10, such as a dryer, coater or granulator, with an agitation system 12(1) in accordance with one embodiment of the present invention is illustrated in FIGS. 1 and 2. The fluid bed processing system 10 includes a product chamber 14 and the agitation system 12(1). In this particular embodiment, the agitation system 12(1) includes a plurality of pipes 16 with outlet jets 18 and a source of fluid 20 connected to the pipes 16. The present invention provides a number of advantages including the ability to achieve more uniform fluidization and heat transfer characteristics across the bed 22 of the product chamber 14.

More specifically, referring to the particular embodiment shown in FIGS. 1 and 2, the product chamber 14 has an open top 24, an open bottom 26, and interior 27, and a funnel shape which slopes down and inward from the open top 24, although the product chamber 14 could have other shapes, such as a partial pyramid shape, and could be straight or sloped in other directions from the open top 24 to open bottom 26 as needed or desired. A flange 28 extends out from the side of the product chamber 14 adjacent the open top 24 and is used to secure the product chamber 14 to an expansion chamber 30, although other types of connectors can be used. In this particular embodiment, a screen 32 is connected to the product chamber 14 across the open bottom 26, although other types of supports for the particles P could be used and the supports could be connected in other locations as needed or desired. The screen 32 has a suitable mesh size to support particles P in the bed 22 of the product chamber 14 near the open bottom 26.

The plurality of pipes 16 extend substantially across the bed 22 of the product chamber 14, although a single pipe 16 could be used and the pipe 16 or pipes 16 could extend over only portions of the bed 22 of the product chamber 14. A plurality of outlet jets 18 are connected to the pipes 16 in the bed 22 of the product chamber 14, although the number of outlet jets 18 and their locations can vary as needed or desired. The outlet jets 18 are positioned to spray a fluid, such as air, out into the particles P in the bed 22 of the product chamber 14 to agitate the particles P. By positioning the pipes 16 and outlet jets 18 to extend across substantially all of the bed 22 of the product chamber 14, the particles P are continually being agitated across the bed 22 which results in more uniform fluidization across and heat transfer in the particles P in the product chamber 14. The pipes 16 are connected to one end of a feed pipe 34 which extends through the side wall of the product chamber 14. The feed pipe 34 may include a valve (not shown) which can be used to control the amount of fluid supplied to the particles P. Although a feed pipe 34 is shown, a feed pipe 34 is not necessary, e.g. one or more of the pipes 16 could extend out of the product chamber 14 and be connected to the source of fluid 20.

The source of fluid 20 which supplies a fluid, such as air, to pipes in the bed 22 of the product chamber 14 is connected to the other end of the feed pipe 34 in this particular embodiment. A separate fluid source 20 from the fluid source 36 for the fluidization supply system 38 described below is used so that the agitation of the particles P can be controlled separately from the fluidization of the particles P. As a result, factors, such as the rate of flow from the fluid sources 20 and 36 and the temperature of the fluid sources 20 and 36, can be optimized for agitation and fluidization, respectively. As the fluid is blown out of the outlet jets 18, the particles P in the product chamber 14 are agitated. The agitation mixes the particles P, breaks up transient, wet agglomerates, and breaks up bubbles caught up in the particles P from the fluid being blown in from the fluidization supply system 38 for fluidization of the particles P. A control system (not shown) for the fluidization supply system for operations, such as turning the fluid supply system on, regulating the rate of flow of fluid from the fluid supply system, regulating the temperature of the fluid from the fluid supply system, would be readily apparent to one of ordinary skill in the art and thus will not be described here.

Figure 3A:
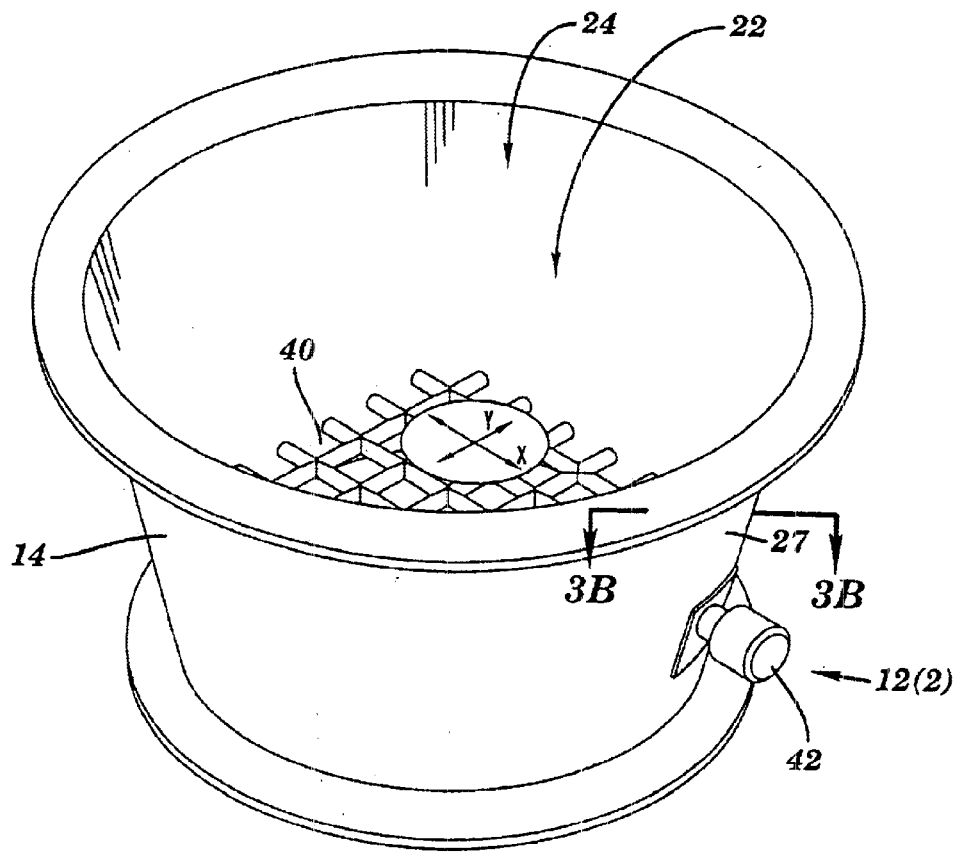
FIG. 3A is a perspective view of an agitation system in a product chamber in accordance with another embodiment of the present invention.
Figure 3B:
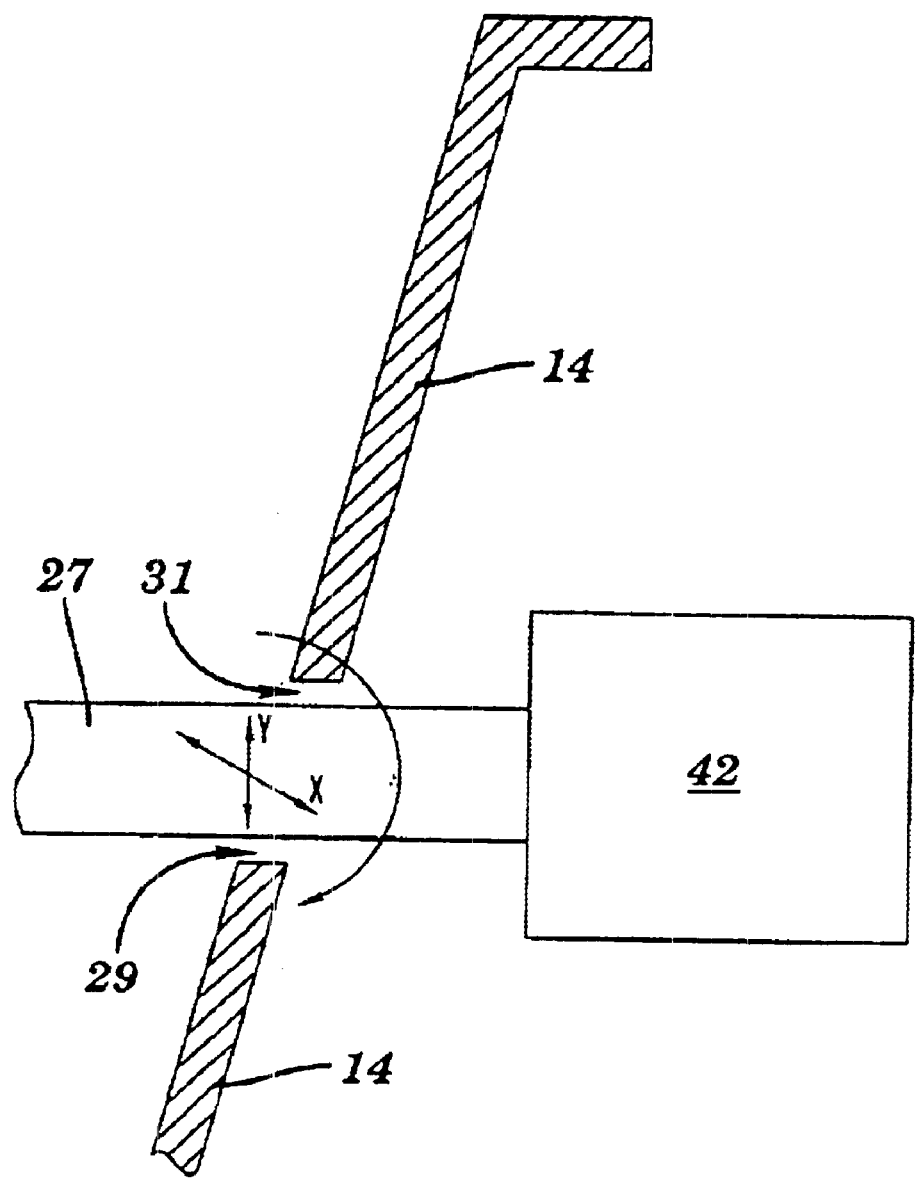
FIG. 3B is a partial, cross-sectional view of a portion of the agitation system and the product chamber taken along lines 3B—3B in FIG. 3A.

Referring to FIGS. 3A and 3B, an alternative embodiment for the agitation system 12(2) is illustrated. In this particular embodiment, a plurality of shafts 40 are interconnected and extend substantially across the bed 22 of the product chamber 14, although a single shaft 40 could be used and the shaft 40 or shafts 40 could extend over only portions of the bed 22 of the product chamber 14 as needed or desired. In this particular embodiment, the interconnected shafts 40 are connected to form a grid structure, although the shafts 40 can be interconnected in other configurations, such as an overlapping configuration. Again, by positioning the shafts 40 to extend across substantially all of the bed 22 of the product chamber 14 as shown, the particles P are continually being agitated across the bed 22 which results in more uniform fluidization and heat transfer characteristics for the particles P in the product chamber 14.

The interconnected shafts 40 are mounted to a support shaft 27 which extends through an opening 29 in the product chamber 14. As illustrated in FIG. 3B, the support shaft 27 is loosely fit through opening 29 to provide a slight gap 31. The slight gap 31 provides room for the support shaft 27 to move, oscillate, or vibrate for example in the X and/or Y direction shown by the arrows. Although not shown, to prevent particles from seeping through the gap 31, a fluid, such as air, could be blown at the opening 29 on the outside of the product chamber 14.

Referring to FIGS. 3A and 3B, an oscillator or motor 42 is connected to the interconnected shafts 40 and moves or oscillates the interconnected shafts 40 in two directions in this particular embodiment. A control system (not shown) for the oscillator or motor 42 which controls operations, such as turning the oscillator or motor 42 on, regulating the rate of oscillations, regulating the direction of oscillations, would be readily apparent to one of ordinary skill in the art and thus will not be described here. In this particular embodiment, the interconnected shafts 40 can be moved or oscillated in two directions, an X and a Y direction, as illustrated by the arrows in FIGS. 3A and 3B, although the interconnected shafts 40 can be oscillated in only one direction or in other directions, such as circular as needed or desired.

Figure 4A:
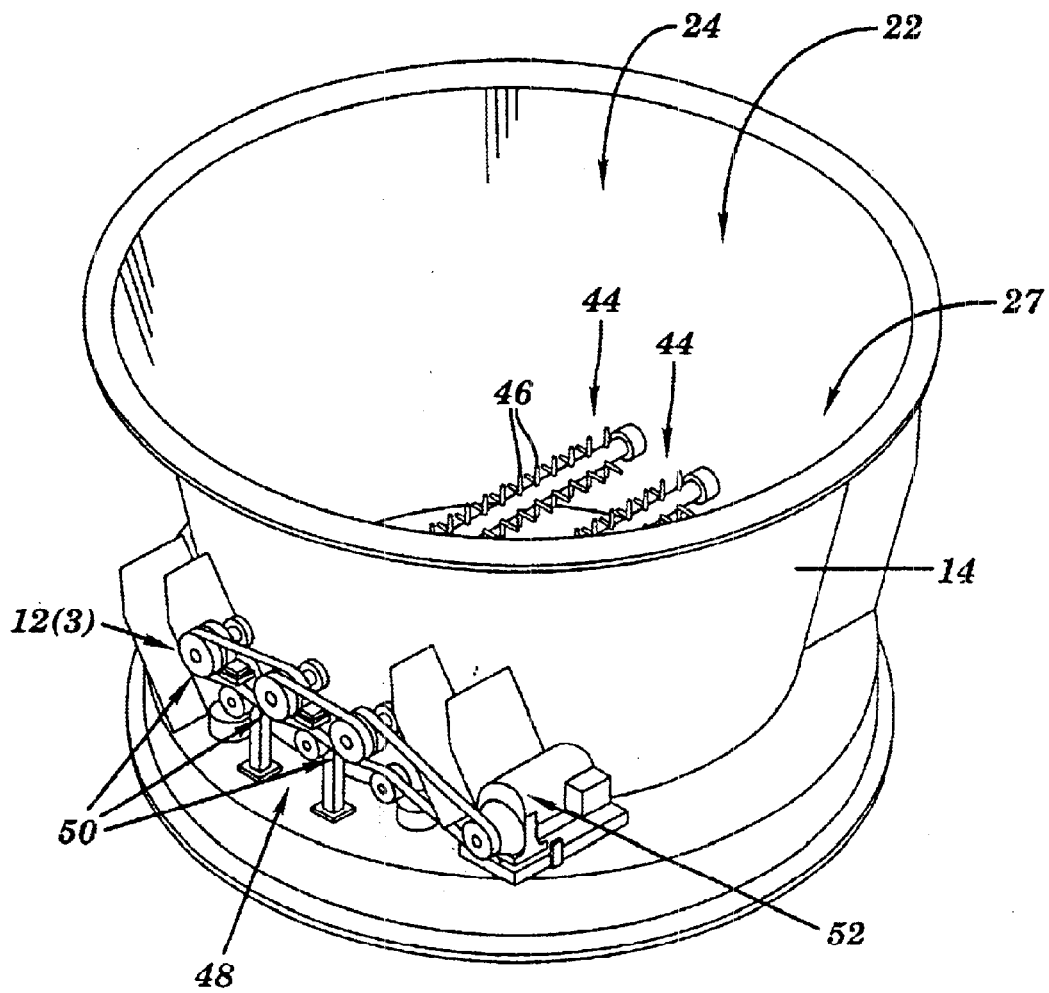
FIG. 4A is a perspective view of an agitation system in a product chamber in accordance with yet another embodiment of the present invention.
Figure 4B:
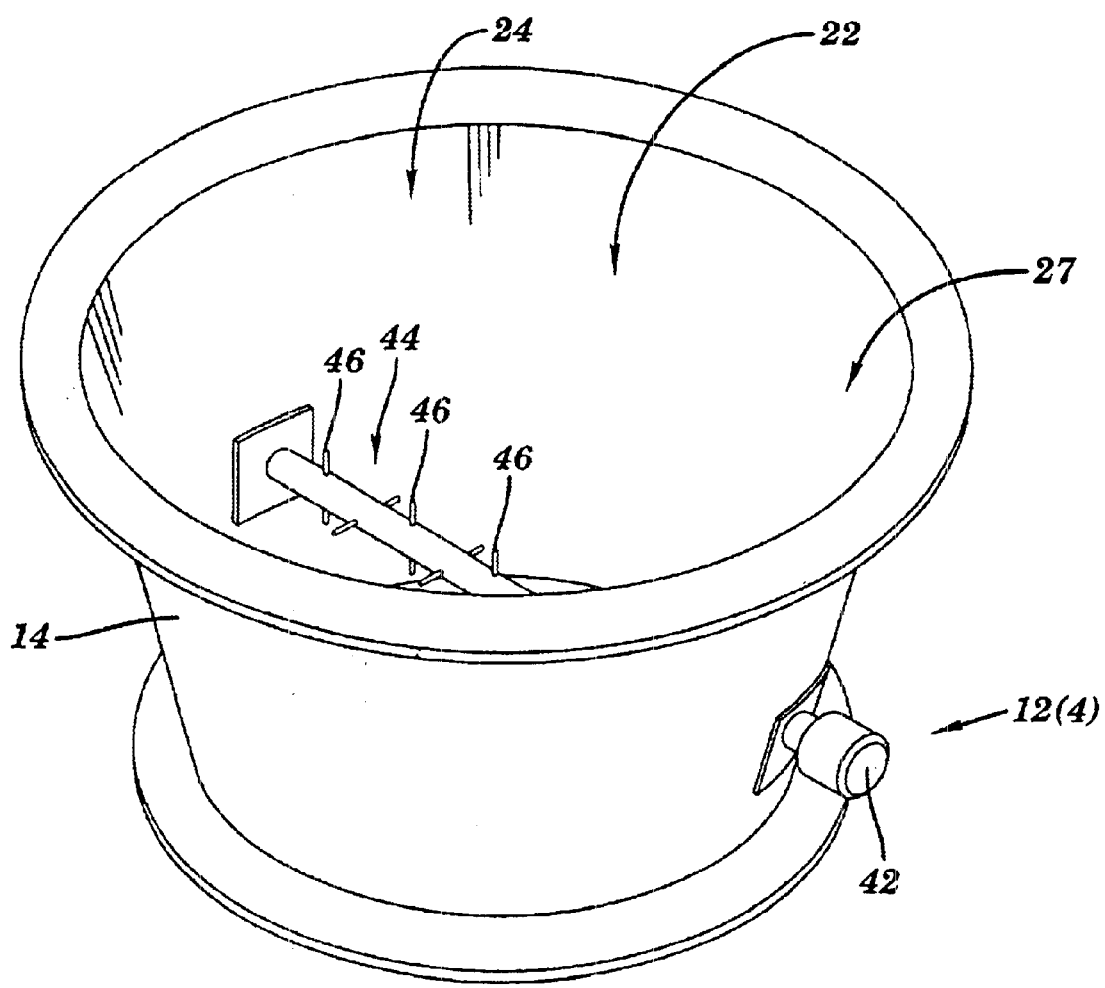
FIG. 4B is a perspective view of an agitation system in a product chamber in accordance with another embodiment of the present invention.

Referring to FIGS. 4A and 4B, additional embodiments of the agitation system 12(3) and 12(4) are illustrated. In the embodiment shown in FIG. 4A, a plurality of shafts 44 extend substantially across the bed 22 of the product chamber 14 each along its own axis, although the shafts 44 could be positioned to extend across only a portion of the bed 22 of the product chamber 14 as needed or desired. Again, by positioning the shafts 44 to extend across substantially all of the bed 22 of the product chamber 14 as shown, the particles P are continually being agitated across the bed 22 which results in more uniform fluidization and heat transfer characteristics for the particles P in the product chamber 14. Although the agitation system 12(3) is shown with three shafts in the particular embodiment shown in FIG. 4A, the agitation system 12(4) could be made with a single shaft 44 as shown in FIG. 4B or with two or four or more shafts 44 as needed or desired.

In this particular embodiment, a plurality of agitating bars 46 extend out from each of the shafts 44. The agitating bars 46 help to agitate the particles P in the bed 22 as the shafts 44 are rotated. In this particular embodiment, the agitating bars 46 have a substantially straight shape, although the agitating bars 46 could have other shapes, such as a J-shape, L-shape, or S-shape, and other configurations. Additionally, although in this particular embodiment each shaft 44 has a plurality of agitating bars 46, the number of agitating bars 46 can vary. For example, each shaft 44 could have one agitating bar 46 or no agitating bars 46. When the shafts 44 are rotated, the agitating bars 46 help to mix and fluidize the particles in the product chamber 14.

A drive system 48 is connected adjacent one end of each shaft 44. In this particular embodiment, the drive system 48 includes a gear box 50 which is connected adjacent to one end of each of the shafts 44 and a motor 52 which is connected to the gear box 50 to rotate the gears and the shafts 44. Since the components of and operation of a gears box 50 and motor 52 are well known to those of ordinary skill in the art, they will not be described in detail here. The drive system 48 rotates each shaft 44 about its own axis.

Referring back to FIGS. 1A and 1B, the fluid bed processing system 10 includes the fluidization supply system 38 for fluidizing the particles P in the product chamber 14 includes a blower 54 and a duct 56 with an outlet 58 which is positioned to direct fluid into the product chamber 14 through the open bottom 26 in the direction shown by the arrows A in FIG. 1B. The fluidization supply system 38 may also include a heater 60 which is used to heat the fluid to a suitable temperature for the coating or agglomeration phase for the particles P. In this particular embodiment, the fluid being supplied by the fluidization supply system 38 is air, although other types of fluid can be used as needed or desired.

A discharge opening 62 is defined between and extending substantially around the outlet 58 of the duct 56 for the fluidization supply system 38 and the open bottom 26 of the product chamber 14. The discharge opening 62 provides a passage for particles to be rapidly discharged from substantially all sides of the product chamber 14.

A collection chamber 64 is connected to the product chamber 14 and is located about the discharge opening 62. The collection chamber 64 receives the particles P from the product chamber 14 when the discharge opening 62 is opened.

A side discharge mechanism 66 is mounted to the interior of the product chamber 14 and can be moved to a first position covering the discharge opening 62, to a second position exposing the discharge opening 62, and to intermediate positions which partially expose the discharge opening 62 and permit the rate of discharge to be controlled. Although in this particular embodiment the side discharge mechanism 66 is located on the inside of the product chamber 14, the side discharge mechanism 66 can be mounted at other locations, such as to the outside of the product chamber 14, as long as the side discharge mechanism 66 can be moved to the first, second and intermediate positions.

The expansion chamber 30 has an interior 67 and an open bottom 68 which is connected to the product chamber 14 about the open top 24. In this particular embodiment, the expansion chamber 30 has a flange 70 which extends around the expansion chamber 30 and is secured to the flange 28 of the product chamber 14 with bolts or other securing devices 72.

The expansion chamber 30 may also include a spray gun 74 with spray nozzles 76 which is connected by a pipe 77 to a fluid source 78 which supplies a fluid, such as a binder solution like water or a coating solution. The spray nozzles 76 are positioned to spray fluid back down towards product chamber 14 and on to the particles P which have been fluidized into the interior of the expansion chamber 30 from the product chamber 14 by the fluidization supply system 38. Although only one spray gun 74 with spray nozzles 76 is shown, the fluid bed processing system 10 may have multiple spray guns 74 with one or multiple nozzles 76, as needed or desired.

A filter 80 may be connected to across an open top 82 of the expansion chamber 30. The filter 80 is used to filter out fluidized particles in the air before the air is discharged from the top of the expansion chamber 30. A mechanism (not shown) may be connected to the filter 80 to periodically shake the filter 80 to discharge captured particles back down towards the expansion chamber 30 and product chamber 14.

Referring to FIGS. 1A–4B, one method for fluid bed processing of particles P will be discussed. First, particles P to be coated or agglomerated comprising single or multiple components are loaded into the product chamber 14. The particles P rest on the screen 32, along the inner surface of the side discharge mechanism 66 and may rest against the inner surface of the product chamber 14 depending upon the amount of particles P loaded into the product chamber 14. With the present invention, a larger volume of particles P can be loaded into the product chamber 14 than was previously possible. As a result, the production capacity of the apparatus for fluid processing of particles P is increased.

Once the particles P are loaded into the product chamber 14, the agitating system 12 can be engaged to begin to agitate the particles P to create more uniform fluidization and heat transfer characteristics in the particles P in the bed 22 of the product chamber 14. As shown in FIG. 2, the particles P can be agitated by fluid being blown out from outlet jets 18 which is supplied from pipes 16 which extend substantially across the bed 22 of the product chamber 14. Alternatively as shown in FIG. 3A, the particles P can be agitated by oscillating or vibrating interconnected shafts 40 which extend substantially across the bed 22 of the product chamber 14 or as shown in FIG. 4A by rotating shafts 44 which have a plurality of agitating bars 46 and which extend substantially across the bed 22 of the product chamber 14 about their respective axes.

One of the advantages of the present invention is that the agitating systems 12 extend substantially across the bed 22 of the product chamber 14 so the particles P are being continually agitated. Continually agitating the particles P across substantially the entire bed 22 of the product chamber 14, instead of no agitation or periodic agitation of portions of the particles P in the product chamber 14, results in more uniform fluidization and heat transfer characteristics.

Meanwhile, the fluidization supply system 38 is engaged to supply a fluid, such as air in this particular example, via the duct 56 to the particles P resting on the screen 32 and in the product chamber 14. The fluid being blown fluidizes some of the particles P up into the expansion chamber 30. Meanwhile, the heater 60 heats the fluid being blown into a suitable temperature for drying, coating, or agglomeration. Another advantage of the present invention is that the agitating system 12 is operated separately from the fluidization supply system 38. As a result, both the agitation system 12 and fluidization supply system 38 can be adjusted to their own optimum settings.

Once some of the particles P have been the fluidized, then in this particular example the optional spray gun 74 in the expansion chamber 30 is engaged to spray a fluid from a fluid source 78 out of spray nozzles 76 on to the particles P. The fluidized particles P are carried up to a point in the expansion chamber 30 where they contact the fine mist of the fluid being sprayed out by the spray gun 74. As the fluidized particles P are wetted, the particles begin to descend back down. The wetted or coated particles P move to the lower part of the expansion chamber 30 due to their increased weight. As the particles P descend, they are dried and made lighter and then are blown up to be sprayed again. During this process, the filter 80 is periodically shaken to release any particles P captured by the filter 80 back down towards the expansion chamber 30 and the product chamber 14.

The spray gun 74 continues to spray solution until the particles P have been enlarged to the desired size from coatings or agglomeration. At that point, the spray gun 74 is turned off. The fluidization supply system 38 continues to supply fluid up into the product chamber 14 to dry the particles P and the agitation system 12 continues to agitate the particles P in the bed 22 of the product chamber 14 to prevent undesired agglomerations from occurring. When the desired amount of moisture or dryness for the particles P is achieved, then the fluidization supply system 38 is turned off. If the spray gun 74 is not used, the particles P are simply fluidized until they have dried sufficiently.

The particles P accumulate in the product chamber 14 adjacent the side discharge mechanism 66 and discharge opening 62. The side discharge mechanism 66 is moved from the first position to the second or an intermediate position to at least partially expose or open the discharge opening 62. The rate of discharge can be controlled by controlling the size the discharge opening 62 is opened with the side discharge mechanism 62. Once all of the particles P have been discharged from the product chamber 14, the side discharge mechanism 66 is moved from the second or intermediate position to the first position to cover the discharge opening 62. The product chamber 14 is now ready to receive more particles P to start the next process.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A fluid bed processing system for particles comprising:

a product chamber with an interior;

a plurality of elongated structures interconnected to form a grid-like structure extending at least partially across the interior of the product chamber, the elongated structures being positioned in the product chamber where particles are to be located;

means for engaging the elongated structures to agitate particles to be treated in the product chamber; and means for forming a fluidized bed of particles at the same time said means for engaging the elongated structures agitates the particles.

2. The fluid bed processing system as set forth in claim 1 further comprising:

an expansion chamber with an interior, the interior of the expansion chamber connected to the interior of the product chamber; and a spraying apparatus extending into the expansion chamber and connected to a second source of fluid for spraying a second fluid onto particles which have been fluidized; wherein said means for forming a fluidized bed of particles comprises a third source of fluid which supplies a third fluid used to fluidize at least a portion of particles in the product chamber into the expansion chamber.

3. A method of fluid processing particles comprising:

loading particles into a product chamber;

agitating the particles in the product chamber with a plurality of elongated structures interconnected to form a grid-like structure, to provide agitated particles; and forming a fluidized bed of said particles by fluidizing at least a portion of said agitated particles into an expansion chamber with a first fluid from a first fluid source.

4. The method as set forth in claim 3 wherein the elongated structures are interconnected across a substantial portion of the product chamber.

5. The method as set forth in claim 4 wherein the step of agitating the particles comprises oscillating the interconnected elongated structures in one direction.

6. The method as set forth in claim 4 wherein the step of agitating the particles comprises oscillating the interconnected structures in two directions.

7. A fluid bed processing system for particles comprising:
a product chamber with an interior;
a plurality of pipes extending at least partially across the interior of the product chamber, the pipes positioned in the product chamber where particles are to be located;
at least one outlet jet connected to each of the pipes;
a first source of fluid connected to each of the pipes to supply the first fluid to the pipes and out through the outlet jets into the particles for agitating particles in the product chamber; and
a fluidizing fluid source in communication with said product chamber for fluidizing particles in the product chamber agitated by said first source of fluid and for forming a fluidized bed of the agitated particles.

8. The fluid bed processing system as set forth in claim 9 further comprising:
an expansion chamber with an interior, the interior of the expansion chamber connected to the interior of the product chamber; and
a spraying apparatus extending into the expansion chamber and connected to a second source of fluid for spraying a second fluid onto particles which have been fluidized by said fluidizing fluid source; wherein
said fluidizing fluid source comprises a third source of fluid which supplies a third fluid used to fluidize at least a portion of particles in the product chamber into the interior of the expansion chamber.

9. A method of fluid processing particles comprising:
loading particles into a product chamber;
agitating the particles in the product chamber with an agitating fluid to form agitated particles, said agitating fluid supplied by a plurality of elongated structures, said plurality of elongated structures comprising a plurality of pipes extending at least partially across the interior of the product chamber and positioned in the product chamber where the loaded particles are located, at least one outlet jet connected to each of the pipes, and a source of said agitating fluid connected to each of the pipes to supply the agitating fluid to the pipes and out through the outlet jets into the particles for agitating particles in the product chamber; and
forming a fluidized bed of said particles by fluidizing at least a portion of said agitated particles into an expansion chamber with a fluidizing fluid from a fluidizing fluid source.

10. A fluid bed processing system for particles comprising:
a funnel-shaped product chamber with an interior;
a horizontally-extending, flat, particle support for supporting a bed of particles in the product chamber;
at least one shaft extending at least partially across the interior of the product chamber and along a respective first axis;
a drive system connected to rotate the shaft about the respective first axis and agitate particles in the interior of the product chamber; and
a fluidizing fluid source in communication with said product chamber for forming a fluidizing flow in said product chamber, fluidizing particles in the product chamber agitated by said shaft, and for forming a fluidized bed of the agitated particles, wherein said first axis is transverse to the direction of travel of said fluidizing flow in said product chamber and said shaft is adapted to continually agitate particles across the bed.

11. The fluid bed processing system as set forth in claim 10 further comprising a plurality of agitating bars extending from the shaft.

12. The fluid bed processing system as set forth in claim 10 wherein said at least one shaft comprises a plurality of shafts each extending at least partially across the interior of the product chamber, each of the shafts extending along a different axis, wherein the drive system is connected to rotate the shafts about their respective axes.

13. The fluid bed processing system as set forth in claim 10 further comprising:
an expansion chamber with an interior, the interior of the expansion chamber connected to the interior of the product chamber; and
a spraying apparatus extending into the expansion chamber and connected to a first source of fluid for spraying a first fluid onto particles which have been fluidized by said fluidizing fluid source; wherein
said fluidizing fluid source comprises a second source of fluid which supplies a second fluid used to fluidize at least a portion of particles in the product chamber into the interior of the expansion chamber.

14. A method of fluid processing particles comprising:
loading particles into a funnel-shaped product chamber;
supporting the particles on a horizontally-extending flat particle support;
agitating the particles in the product chamber with at least one shaft extending at least partially across the interior of the product chamber and along a respective first axis, said shaft being connected to a drive system that rotates the shaft about the respective first axis, said shaft agitating particles in the interior of the product chamber to form agitated particles; and
forming a fluidized bed of said particles by fluidizing at least a portion of said agitated particles into an expansion chamber with a fluidizing fluid from a fluidizing fluid source, said fluidizing fluid source (1) being in communication with said product chamber for forming a fluidizing flow in said product chamber, (2) fluidizing particles in the product chamber agitated by said shaft, and (3) forming a fluidized bed of the agitated particles, wherein said first axis is transverse to the direction of travel of said fluidizing flow in said product chamber.

* * * * *